(12) United States Patent
Hosomi et al.

(10) Patent No.: US 6,535,363 B1
(45) Date of Patent: Mar. 18, 2003

(54) MAGNETIC RESISTANCE EFFECT TYPE THIN-FILM MAGNETIC HEAD AND METHOD FOR MANUFACTURING THE SAME

(75) Inventors: Masataka Hosomi, Amagasaki (JP); Tatsuo Sawasaki, Amagasaki (JP); Kouichi Matsuhashi, Osaka (JP)

(73) Assignee: Read-Rite SMI Corporation, Osaka (JP)

( * ) Notice: Subject to any disclaimer, the term of this patent is extended or adjusted under 35 U.S.C. 154(b) by 0 days.

(21) Appl. No.: 09/482,784

(22) Filed: Jan. 13, 2000

(30) Foreign Application Priority Data

Jan. 13, 1999 (JP) .......................................... 11-006078

(51) Int. Cl.⁷ ................................................ G11B 5/39
(52) U.S. Cl. .................. 360/324.1; 360/327.2
(58) Field of Search .................. 360/324.2, 324.11, 360/324.1, 327.2, 327.23, 327.31, 324, 313, 324.12, 327, 123; 338/32 R; 29/603.13, 603.14

(56) References Cited

U.S. PATENT DOCUMENTS

| | | | | |
|---|---|---|---|---|
| 5,923,503 A | * | 7/1999 | Sato et al. .................. | 360/327 |
| 6,025,979 A | * | 2/2000 | Yamane et al. ........... | 360/324.1 |
| 6,031,692 A | * | 2/2000 | Kawawake et al. ..... | 360/324.12 |
| 6,178,074 B1 | * | 1/2001 | Gill ............................ | 360/313 |
| 6,201,465 B1 | * | 3/2001 | Saito et al. ............... | 338/32 R |
| 6,219,208 B1 | * | 4/2001 | Gill ........................... | 360/324.1 |
| 6,222,707 B1 | * | 4/2001 | Huai et al. ................. | 360/324.1 |

* cited by examiner

Primary Examiner—Brian E. Miller
Assistant Examiner—Tianjie Chen
(74) Attorney, Agent, or Firm—Burgess & Bereznak, LLP (57) ABSTRACT

A thin-film magnetic head in which has a spin-valve element and a pair of electrode layers that are electrically connected to both ends of the element in the direction of width. A tantalum film is laminated as a protective layer on the uppermost part of the abovementioned element. A pair of electrode layers are caused to overlap on both end portions of the element. The tantalum oxide present in the areas on which the electrode layers overlap is removed prior to the formation of the electrode layers so that the electrical resistance between the electrode layers and the element is reduced.

3 Claims, 6 Drawing Sheets

MAGNETIC RESISTANCE EFFECT TYPE THIN-FILM MAGNETIC HEAD AND METHOD FOR MANUFACTURING THE SAME

BACKGROUND OF THE INVENTION

1. Field of the Invention

The present invention concerns a magnetic resistance effect type magnetic head which is installed in hard disk drives, etc., and a method for manufacturing the same. More specifically, the present invention concerns a spin-valve magnetic head which has a high output, low noise and stable output characteristics useful for high-density recording.

2. Background Information

As surface recording density has increased in recent years, composite heads in which a magnetic resistance effect type head equipped with a magnetic resistance effect element (MR element) as a magnetism-sensing part is integrally laminated with an inductive head used for recording have become the mainstream of thin-film magnetic heads installed in hard disk drives.

The term "magnetic resistance effect" refers to an effect in which the electrical resistance changes when a magnetic field is applied to a conductive magnetic material. Variations in magnetic fields can be detected utilizing an element which has this effect, so that information recorded on a magnetic medium can be read. Such magnetic resistance effect elements include anisotropic magnetic resistance effect elements (AMR elements) which are equipped with a ferromagnetic thin film that has uniaxial anisotropy in the direction of the sensing current, and in which the electrical resistance of this ferromagnetic thin film varies as a result of rotation of the magnetization when an external magnetic field is applied from a magnetic recording medium in the direction of the axis of difficult magnetization, and GMR elements such as spin-valve elements which show a large magnetic resistance effect, etc. In the case of the magnetic resistance effect type elements, a sensing current is applied and the variation in resistance is detected; i.e., the magnetic field is detected rather than a time differentiation of the magnetic flux. Accordingly, the output is unaffected by the movement speed of the magnetic recording medium, so that there are essentially no frequency limits in practical bandwidths. Consequently, there is no inherent noise mechanism that causes deterioration of the signal-to-noise ratio. Furthermore, size reduction is easy, and information recorded on a magnetic recording medium at an extremely high surface recording density can easily be distinguished and extracted.

In such magnetic resistance effect heads, a magnetic resistance effect element is ordinarily disposed between upper and lower shielding layers with gap layers interposed, and a pair of electrode layers (left and right electrode layers) which apply the sensing current to the element are connected to both end portions of the element. Furthermore, in order to form the magnetic resistance effect element into a single magnetic domain and eliminate the generation of Barkhausen noise, hard bias layers are disposed on both edges of the element. In the case of current spin-valve heads, the electrodes used to apply current to the spin-valve film usually employ an abutted junction structure adjacent to the end portions of the spin-valve film (for example, see Japanese Patent Application Kokai No. 10-154314).

There has been a demand from the industry to increase the memory capacity of hard disk drives at the rate of 60% per year. As a result of this demand, it has been necessary to achieve a much greater increase in recording density. In order to increase the recording density, improvement of the operating characteristics of both the inductive head and the magnetic resistance effect head is an essential technical task. The main technical tasks in magnetic resistance effect heads are improving durability with respect to electrostatic discharge, increasing the output, narrowing the track width and handling a narrow gap width.

In recent years, as a result of the employment of lead overlaid structures in which the electrodes are overlapped on the upper portion of the MR element of a spin-valve film, etc., the durability of heads with respect to electrostatic discharge has been improved, and it has been possible to narrow the track width of the playback head without lowering the sensitivity. Furthermore, it has been reported that noise and hysteresis are also controlled (for example, see Japanese Patent Application Kokai No. 9-282618, Nikkei Electronics 1998, 11, 2, p.54, etc.).

SUMMARY OF THE INVENTION

One embodiment of the present invention obtains a thin-film magnetic head in which the sensitivity distribution of the spin-valve element is good, and which has a large output and little noise or hysteresis. In one embodiment, a spin-valve head includes a spin-valve element and a pair of electrode layers that are electrically connected to both ends of this element in the direction of width. In one embodiment, a tantalum film is laminated as a protective layer on the uppermost part of the element, and the pair of electrode layers are caused to overlap on both end portions of the element. In one embodiment, the tantalum oxide present in the areas on which the electrode layers overlap is removed prior to the formation of the electrode layers so that the electrical resistance between the electrode layers and the element is reduced.

BRIEF DESCRIPTION OF THE DRAWINGS

The present invention detailed illustrated by way of example and not limitation in the accompanying figures.

EXPLANATION OF SYMBOLS

1 Lower shielding layer
2 Lower playback half-gap layer
3 Spin-valve element (thin-film magnetic resistance effect element)
7 Antiferromagnetic layer
8 Protective layer
9 Magnetic domain control layers
10 Electrode layer
11 Electrode layer
12 Upper playback half-gap layer
13 Upper shielding layer

DETAILED DESCRIPTION

Figure 12:
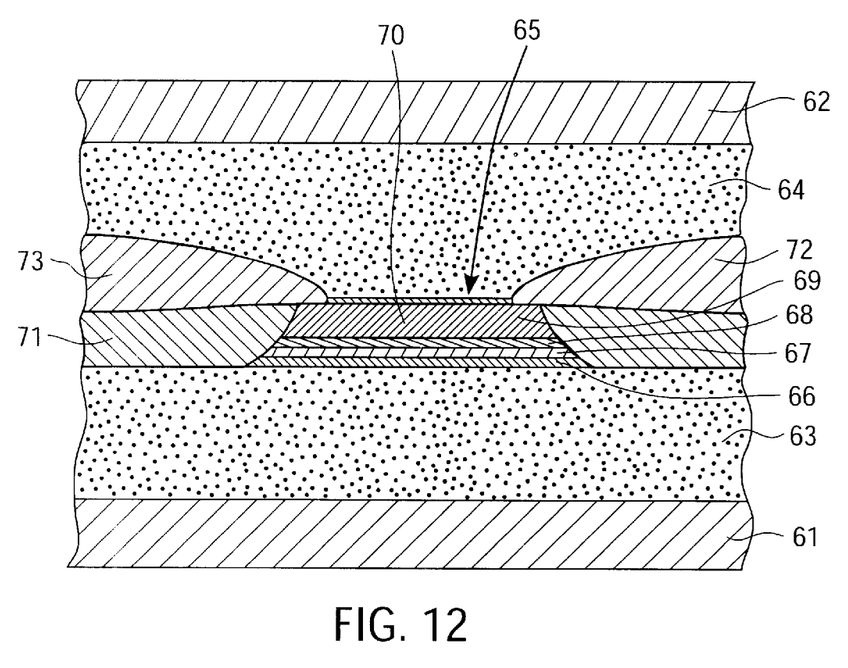
FIG. 12 is a sectional view of a spin-valve head with a lead overlaid structure.

The present inventors built a prototype spin-valve head (thin-film magnetic resistance effect type head) with the lead overlaid structure shown in FIG. 12, and tested the operating characteristics of this head. The spin-valve head used in this experimental example is a shielded magnetic resistance effect thin-film magnetic head in which a spin-valve element 65 is disposed between upper and lower shielding layers 61 and 62 with gap layers 63 and 64 interposed. The spin-valve element 65 is constructed by successively laminating a free magnetic layer 66, a nonmagnetic conductive layer 67, a fixed magnetic layer 68, an antiferromagnetic layer 69 and a protective layer 70 consisting of a Ta film. Furthermore, magnetic domain control layers (hard bias layers) 71 which are used to form the free magnetic layer 66 into a single magnetic domain are disposed adjacent to the both sides of the spin-valve element 65 with respect to the direction of width of this element 65, and a pair of electrode layers 72 and 73 (left and right electrode layers) are laminated on top of these magnetic domain control layers 71. The spacing of these electrode layers 72 and 73 is set so that this spacing is narrower than the spacing of the left and right magnetic domain control layers 71, and narrower than the width of the spin-valve element 65, and the electrodes 72 and 73 are caused to overlap on both end portions of the spin-valve element 65 with respect to the direction of width of this element 65.

As a result of various types of tests performed on such a head, it was found that the distribution of the current density flowing through the spin-valve element was disturbed. As a result of an elucidation of the causes of this disturbance by the present inventors, it was ascertained that the cause was as follows. In the manufacturing process preceding the formation of the electrode layers, the Ta film 70 of the uppermost layer of the spin-valve element 65 was oxidized, so that the electrical resistance between the electrodes 72 and 73 and the element 65 increased. In this type of spin-valve head, a protective film 70 is necessary in order to prevent oxidation of the antiferromagnetic layer during the formation of the hard bias layers, etc., and in order to improve the heat resistance of the spin-valve element during heat treatment. However, if a lead overlaid structure is used, such a protective film 70 causes a deterioration in the playback characteristics as described above.

On the basis of such findings, one embodiment of the present invention achieves a great improvement in output and a decrease in noise and hysteresis in a magnetic resistance effect type thin-film magnetic head with a lead overlaid structure.

Specifically, one embodiment of the present invention is characterized by the fact that in a magnetic resistance effect type magnetic head [a] which has a thin-film magnetic resistance effect element and a pair of electrode layers that are electrically connected to both ends of this element in the direction of width, [b] in which a protective layer is laminated on the uppermost part of the abovementioned element, and [c] in which the pair of electrode layers are caused to overlap on both end portions of the element, the aforementioned protective layer is removed in the areas where the electrode layers overlap. In this thin-film magnetic head of the present invention, even if the protective layer constituting the uppermost portion of the element is oxidized during the manufacturing process preceding the formation of the electrode layers so that the electrical resistance increases, the protective layer is removed at least in the areas where the electrode layers overlap with the element. Accordingly, the electrical resistance between the electrode layers and the thin-film magnetic resistance effect element is reduced, so that current flows through the areas of overlap between the electrodes and the element. As a result, the distribution of the current density is stabilized and the output is greatly improved. Furthermore, noise and hysteresis are also suppressed.

Furthermore, in regard to the thin-film magnetic resistance effect element, a spin-valve element is most promising for a head used in a compact high-density magnetic recording device. In particular, the present invention can be applied most effectively to a bottom type spin-valve in which an antiferromagnetic layer is laminated on the side of the upper layer. Of course, the present invention can also be applied to heads using conventional universally known AMR elements, or other MR elements or GMR elements.

In cases where the thin-film magnetic resistance effect element in the abovementioned thin-film magnetic head has an antiferromagnetic layer, and a protective layer is laminated on the surface of this antiferromagnetic layer, a pair of electrode layers can be respectively caused to contact the surface of the end portions of the antiferromagnetic layer with respect to the direction of width of said layer on both sides of the abovementioned protective layer with respect to the direction of width of said protective layer. Furthermore, in a head with such a structure, it was confirmed by experiments performed by the inventors of the present application that even if approximately 30 angstroms of the antiferromagnetic layer underlying the protective layer is removed by milling when the protective layer is removed by milling, this has almost no effect on the playback characteristics. Specifically, this means that there is no great requirement for strict control of the amount of milling of the protective layer in the present invention, so that increased productivity and an increased yield can be obtained.

Furthermore, in cases where a pair of magnetic domain control layers are disposed adjacent to both sides of the thin-film magnetic resistance effect element with respect to the direction of width of said element, it is desirable to use a construction in which [a] electrode layers are laminated on the surfaces of these magnetic domain control layers, [b] the spacing between the pair of electrode layers is set so that this spacing is smaller than the spacing between the pair of magnetic domain control layers, and [c] the portions of the electrode layers that protrude further inward in the direction of width than the magnetic domain control layers are caused to contact the areas on both end portions of the element from which the protective layer has been removed.

Furthermore, the present invention is also characterized by the fact in a method for manufacturing a magnetic resistance effect type magnetic head [a] which has a process in which a thin-film magnetic resistance effect element and a pair of electrode layers that are electrically connected to both ends of the abovementioned element in the direction of width are laminated and formed, and [b] in which the aforementioned electrode layers are laminated so that said electrode layers overlap on both end portions of the abovementioned element with respect to the direction of width of said element, said method includes a process in which the surface layer portion on the upper surface side of the aforementioned element is removed after the thin-film magnetic resistance effect element has been formed, but prior to the formation of the electrode layers. In this manufacturing method of the present invention, even if the surface layer portions on both end portions with respect to the direction of width of the thin-film magnetic resistance effect element which are contacted by the end portions of the aforementioned electrode layers are oxidized during the manufacturing process preceding the formation of the electrode layers so that the electrical resistance increases, the electrode layers are formed after these surface layer portions have been removed. Accordingly, the electrical resistance between the electrode layers and the thin-film magnetic resistance effect element is reduced, so that stabilization of the current density distribution, an increase in output and suppression of noise and hysteresis can be achieved. Furthermore, when the heat treatment that is used to control the exchange coupling between the fixed magnetic layer and antiferromagnetic layer of the spin-valve element in one direction is performed immediately following the formation of the element, the surface layer portion of the element can be protected by the protective layer. Then, the protective layer present on the surface layer portion can be removed, and the electrode layers can be connected to these areas where the protective layer has been removed.

It is desirable that the removal of the surface layer portion on the upper surface side of the element be performed only in both end portions of the element with respect to the direction of width of the element. In particular, in cases where a protective layer is laminated on the uppermost portion of the element, this protective layer remains in the central portion of the element if the protective layer is removed only from both end portions with respect to the direction of width. Accordingly, the element can be protected from the heat treatment, etc., performed during gap layer formation following the formation of the electrode layers.

The abovementioned manufacturing method of the present invention can also be applied to AMR elements, etc. Preferably, however, the present invention is applied to heads in which the thin-film magnetic resistance effect element is a spin-valve element, and a protective layer is laminated on the uppermost portion of this element. In this case, the removal of the surface layer portion on the upper surface side of the element can be a process in which a specified amount of the protective layer is removed. Specifically, the present invention includes processes in which all of the protective layer in the areas of both end portions of the element is removed, in addition to processes in which not all of the protective layer is removed so that a slight amount of the protective layer remains.

A working configuration of the present invention will be described below with reference to the attached figures.

FIGS. 1 through 6 illustrate the manufacturing process of a magnetic resistance effect type thin-film magnetic head constituting one working configuration of the present invention. Furthermore, this type of thin-film magnetic head is constructed by successively laminating respective constituent layers on a wafer. The magnetic head shown as an example in the figures is also called a "horizontal MR," and is arranged so that the sensing current is applied in a direction parallel to the surface of the recording medium. Magnetic shielding layers 1 and 13 are laminated above and below the element 3 with playback gap layers 2 and 12 interposed. Ordinarily, furthermore, an inductive head used for recording is integrally laminated above or below the abovementioned magnetic head, so that a composite head consisting of this inductive head and the magnetic resistance effect head is constructed.

To describe the layer construction of the MR head shown in the figures, this head is equipped with upper and lower shielding layers 1 and 13, a magnetic resistance effect element 3 which is disposed between these upper and lower shielding layers 1 and 13 with gap layers 2 and 12 interposed, magnetic domain control layers 9 which are disposed adjacent to both sides of the magnetic resistance effect element 3 with respect to the direction of width of said element (i.e., with respect to the direction of current application), and a pair of electrode layers 10 and 11 which are respectively electrically connected to both sides of the magnetic resistance effect element 3 with respect to the direction of width of said element.

A spin-valve film in which a free magnetic layer 4 consisting of a soft magnetic material, a non-magnetic conductive layer 5, a fixed magnetic layer 6 consisting of a soft magnetic material, an antiferromagnetic layer 7 and a protective layer 8 consisting of a tantalum film are laminated in that order is indicates as an example of the magnetic resistance effect element 3. However, the present invention is not limited to such a construction. Permanent magnet layers or laminated bodies consisting of an antiferromagnetic layer and a soft magnetic layer may be used as the magnetic domain control layers 9, 9 formed on both sides of the element 3. Furthermore, conductors consisting of Cu, Ag or Au, etc., may be used as the electrode layers 10 and 11.

The respective layers mentioned above can be formed with the desired shape and thickness using photolithography or conventional universally known vacuum thin film formation techniques such as ion milling, sputtering, RIE or plasma CVD, etc.

Below, the manufacturing processes of the present working configuration will be explained in the order in which said processes are performed.

Figure 1:
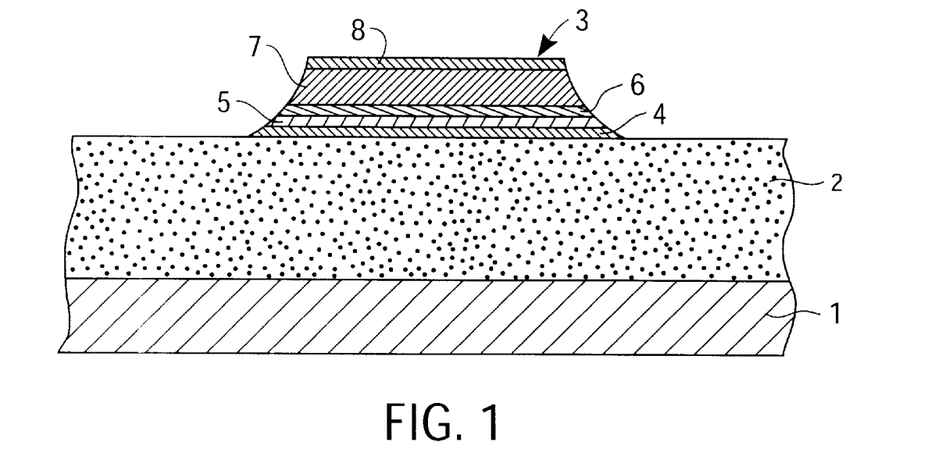
FIG. 1 shows the manufacturing process of a thin-film magnetic head constituting one working configuration of the present invention, and is a sectional view showing the state immediately following the formation of the spin-valve element.

FIG. 1 shows a sectional view of the completed spin-valve element 3. The processes up to this point are the same as in a conventional method. A lower shielding layer 1 and lower playback half-gap layer 2 are formed with specified thicknesses, and a free magnetic layer 4, non-magnetic conductive layer 5, fixed magnetic layer 6, antiferromagnetic layer 7 and protective layer 8 are also formed with specified thicknesses. Afterward, a heat treatment is performed at a fixed temperature in order to control the exchange coupling between the fixed magnetic layer 6 and the antiferromagnetic layer 7 in one direction. Then, after this, the constituent layers of the spin-valve film are worked into a specified shape by an appropriate means such as ion milling, etc. In this process, the protective layer 8 on the surface portion of the element 3 may be non-uniformly oxidized.

Figure 2:
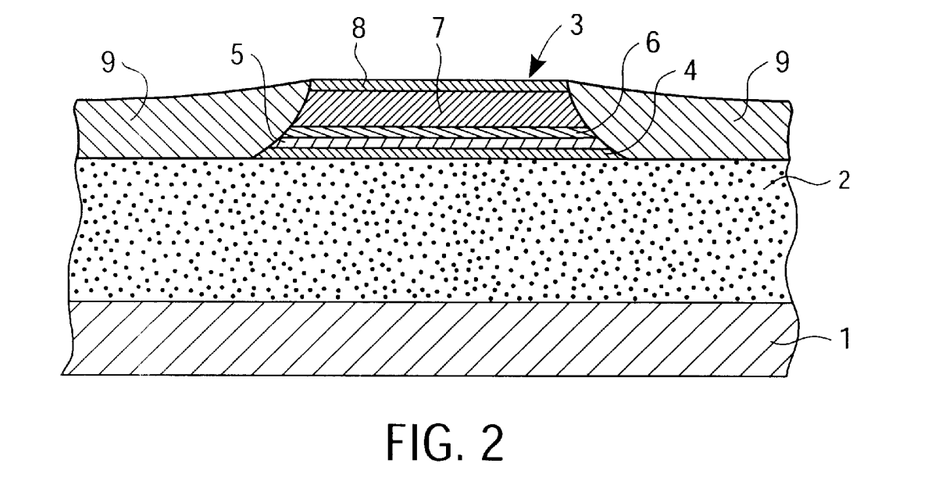
FIG. 2 shows the same manufacturing process, and is a sectional view showing the formation of the magnetic domain control layers.

Next, as is shown in FIG. 2, permanent magnet layers 9 are formed on both sides of the spin-valve element 3 with respect to the direction of width of said element as magnetic domain control layers. Next, the electrode layers 10 and 11 are laminated. However, since there is a deleterious effect on the characteristics of the head if the abovementioned tantalum oxide is interposed between the electrodes and the element, this tantalum oxide is removed by the following process prior to the formation of the electrode layers 10 and 11.

Figure 3:
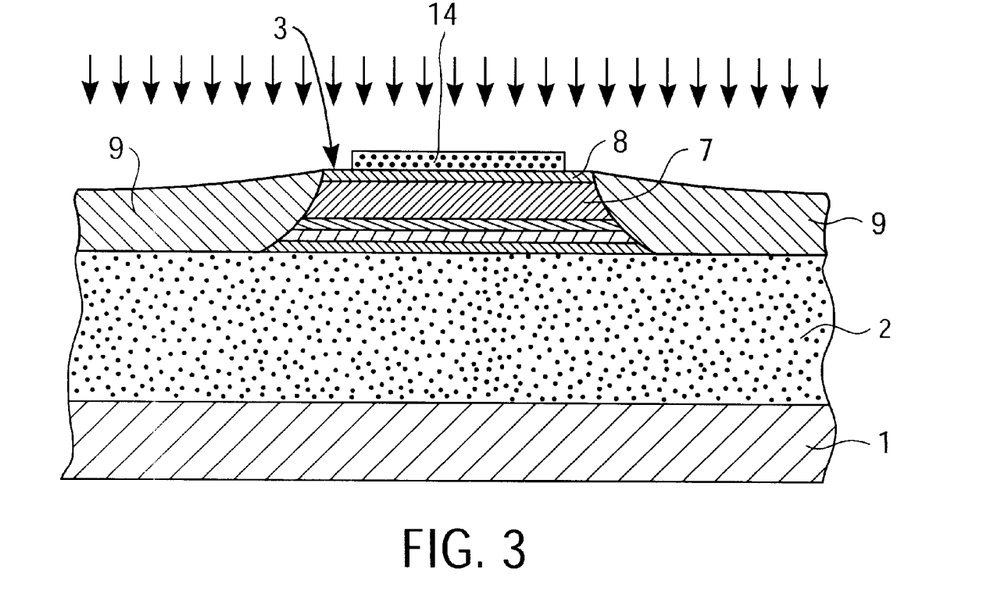
FIG. 3 shows the same manufacturing process, and is a sectional view showing the protective layer removal process.
Figure 4:
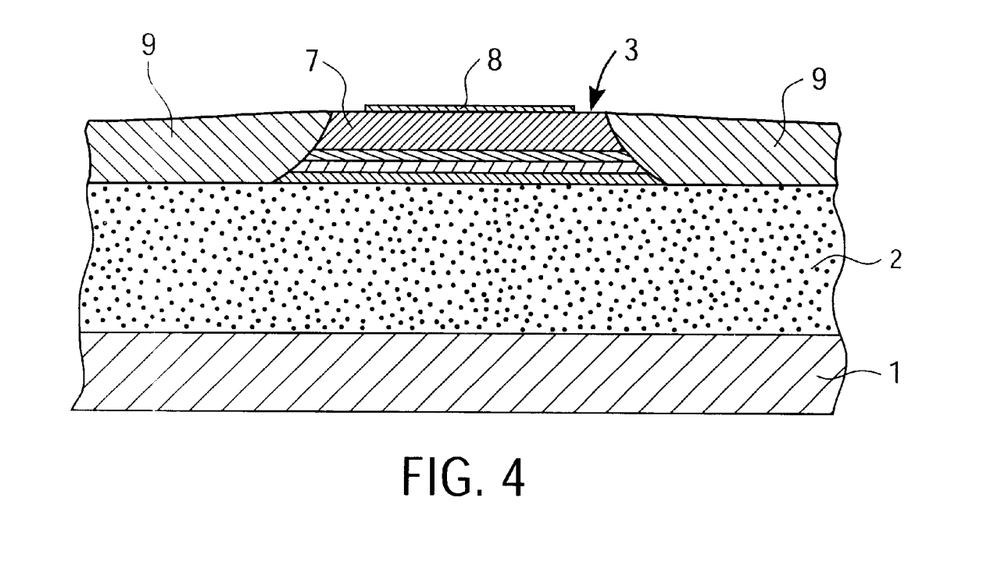
FIG. 4 shows the same manufacturing process, and is a sectional view showing the state following the removal of both end portions of the protective layer in the direction of width.

Specifically, as is shown in FIG. 3, ion milling is performed with a masking layer 14 patterned so that only the areas on both end portions of the element 3 with respect to the direction of width of said element are exposed, thus removing the protective layer 8 present in the surface layer portion on the upper surface side of the element 3 in the areas on both end portions with respect to the direction of width of the element. The amount of milling in this case can be appropriately set in accordance with the required performance. It is not always necessary to perform this etching until the antiferromagnetic layer 7 is exposed. In the present example, however, all of the protective layer 8 within the areas on both end portions of the element is removed. As a result of such etching of the protective layer 8, the antiferromagnetic layer 7 is exposed in the areas on both end portions of the spin-valve element 3 with respect to the direction of width of said element, but the protective layer 8 is allowed to remain in the central area of the element, as shown in FIG. 4.

Figure 5:
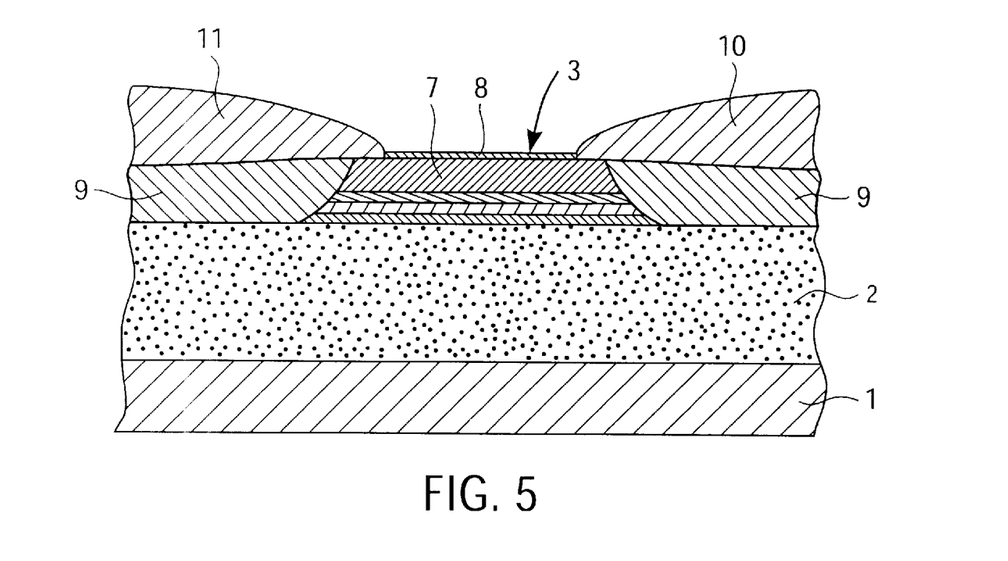
FIG. 5 shows the same manufacturing process, and is a sectional view showing the formation of the electrode layers.

After the protective layer 8 has been partially removed, left and right electrode layers 10 and 11 are laminated so that these layers overlap on both end portions of the element 3 with respect to the direction of width of the element as shown in FIG. 5. Since the areas from which the protective film 8 has been removed are covered by the electrode layers 10 and 11, the surface portion of the element 3 can be protected from oxidation.

The abovementioned electrode layers 10 and 11 are laminated on the magnetic domain control layers 9, and are constructed so that the spacing between the electrode layers 10 and 11 is smaller than the spacing between the left and right magnetic domain control layers 9, 9. Thus, the portions of the electrode layers 10 and 11 that protrude further inward in the direction of width than the magnetic domain control layers 9 (i.e., the protruding portions of the electrode layers) are caused to contact the surfaces of both end portions of the element 3 with respect to the direction of width of the element from which the protective layer 8 has been removed.

Figure 6:
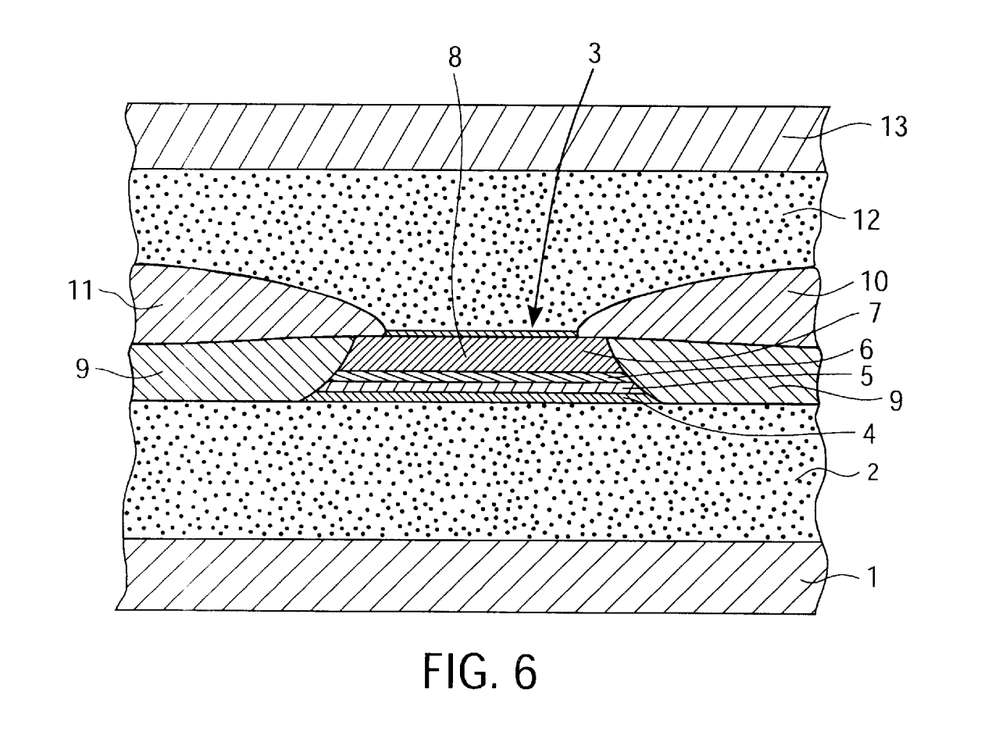
FIG. 6 is a sectional view of essential parts showing the completed manufacture of the same thin-film magnetic head.

Afterward, the upper playback half-gap layer 12 and the upper shielding layer 13 are successively laminated.

Figure 7:
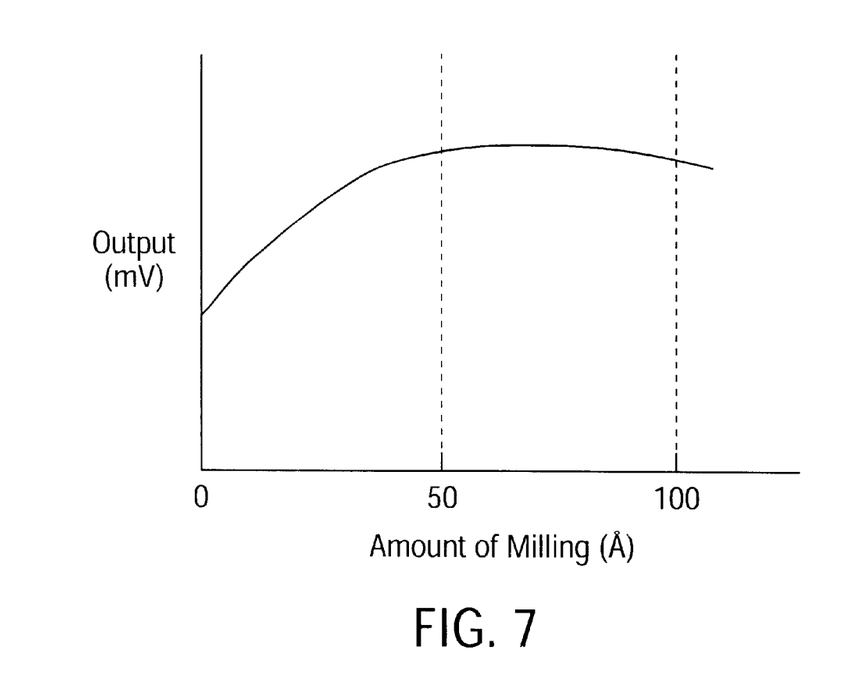
FIG. 7 is a graph showing the output characteristics of a thin-film magnetic head constituting a working example of the present invention; this graph shows the relationship between the amount of milling in the areas on both end portions of the magnetic resistance effect element (with respect to the direction of width of said element) and the playback output.
Figure 8:
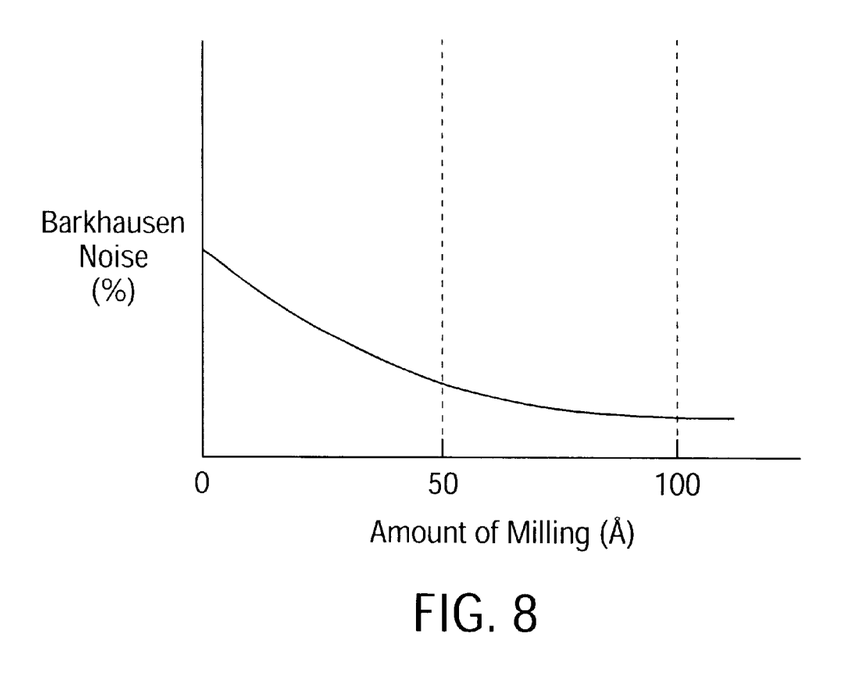
FIG. 8 is a graph showing the noise characteristics of the same head and shows the relationship between the amount of milling in the areas on both end portions of the magnetic resistance effect element (with respect to the direction of width of said element) and the playback output.

FIGS. 7 and 8 are characteristic graphs illustrating working examples in which the thickness of the protective layer 8 was set at 50 angstroms, and the amount of milling of the surface layer portions in the areas on both end portions of the element 3 with respect to the direction of width of the element was varied.

As is shown in FIG. 7, the playback output improves as the amount of milling is increased. Furthermore, the Barkhausen noise drops as shown in FIG. 8. Thus, the present invention makes it possible to obtain a great increase in output, and to reduce noise.

Furthermore, it is clear from the graph shown in FIG. 7 that even in cases where the amount of milling performed is 50 angstroms or greater, i.e., in cases where the antiferromagnetic layer 7 is also milled, there is no deleterious effect on the output characteristics. Accordingly, even if the amount of milling is not strictly controlled, a great improvement in the output characteristics and a great reduction in noise can be achieved relatively easily in the present invention.

Figure 9:
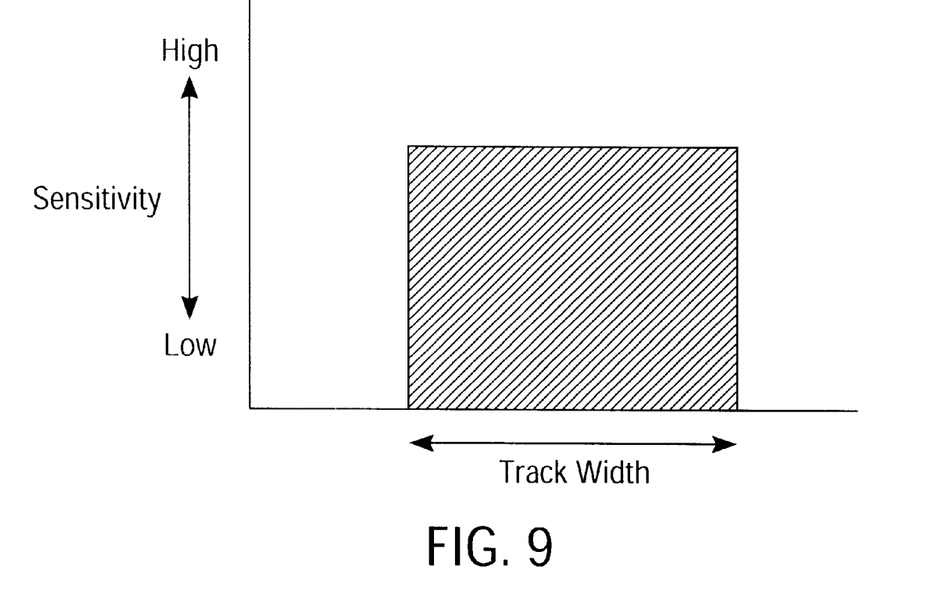
FIG. 9 is a diagram which shows the ideal shape of the micro-track profile of a magnetic resistance effect type thin-film magnetic head.

Furthermore, in order to verify how the sensitivity distribution of the spin-valve element in the direction of width is caused to vary by the present invention, a micro-track profile was determined by means of a spin-stand test. This micro-track profile expresses the sensitivity distribution of the spin-valve element in the direction of width. As an ideal shape, it is desirable that the rise in the end portions of the element with respect to the direction of width of the element be steep, and that the sensitivity (vertical axis) show a large value, as shown in FIG. 9.

Figure 10:
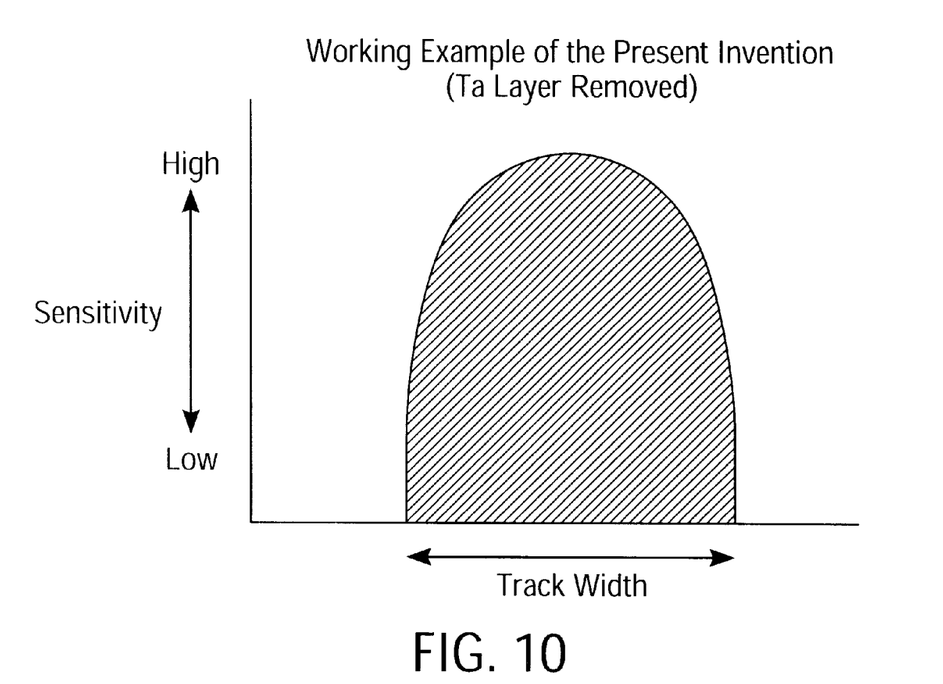
FIG. 10 is a diagram which shows the micro-track profile of a thin-film magnetic head constituting a working example of the present invention.

A model diagram of typical micro-track profile data for the thin-film magnetic head of the abovementioned working configuration of the present invention is shown in FIG. 10. Furthermore, a model diagram of type micro-track profile data for a thin-film magnetic head constituting a comparative example in which the protective layer was not removed is similarly shown in FIG. 11. The magnetic head of this comparative example was formed under the same conditions as the head of the working configuration, except that the protective layer was not removed.

Figure 11:
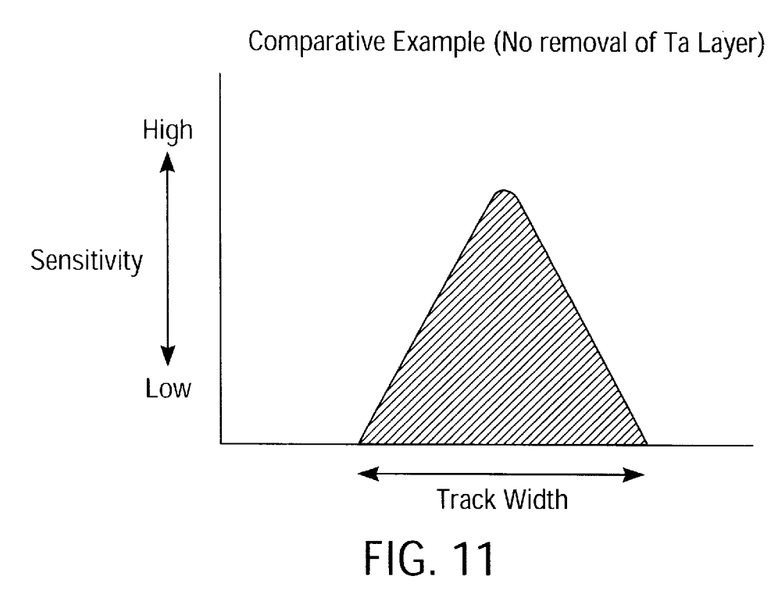
FIG. 11 is a diagram which shows the micro-track profile of a thin-film magnetic head constituting a comparative example.

In the thin-film magnetic head of the abovementioned working configuration of the present invention, as is clear from a comparison of FIGS. 10 and 11, the rise in the areas of both end portions in the direction of the track width is steep, and the maximum value of the sensitivity is large, compared to the thin-film magnetic head of the comparative example. It is thus seen that an ideal shape is more closely approached in the head of the present invention.

In the present invention, the distribution of the current density flowing through the element can be stabilized, the playback output can be greatly improved, and noise and hysteresis can be greatly reduced, in an MR head with a lead overlaid structure. Accordingly, the present invention makes it possible to manufacture a thin-film magnetic head which allows the accurate reading of information recorded at a much higher recording density.

What is claimed is:
1. A thin-film magnetic resistance effect type magnetic head, comprising:
   upper and lower shield layers;
   upper and lower gap layers disposed between the upper and lower shield layers, respectively, a structure being disposed between the upper and lower gap layers which includes:
   a thin-film magnetic resistance effect element that includes an upper antiferromagnetic layer;
   a pair of electrode layers, each overlapping and being electrically coupled to an opposite end of the upper antiferromagnetic layer of the thin-film magnetic resistance effect element;

a pair of magnetic domain control layers disposed on opposite sides of the thin-film magnetic resistance effect element, wherein a spacing between the pair of electrode layers is smaller than a spacing between the pair of magnetic domain control layers; and a thin protective layer of Ta covering an uppermost part of the upper antiferromagnetic layer between the pair of electrode layers, the protective layer being absent on each opposite end of the uppermost part where the electrode layers are electrically coupled to the upper antiferromagnetic layer of the thin-film magnetic resistance effect element.

2. A thin-film magnetic resistance effect type magnetic head, comprising:

a spin-valve element that includes a thin protective layer of Ta laminated on an antiferromagnetic layer;

a pair of magnetic domain control layers disposed on opposite sides of the spin-valve element;

a lead overlaid structure that includes a pair of electrode layers disposed on opposite sides of the spin-valve element above a pair of magnetic domain control layers, each electrode layer overlapping and being electrically coupled to a Ta removed surface portion of the end portions of the antiferromagnetic layer, wherein a spacing between the electrode layers is smaller than a spacing between the magnetic domain control layers.

3. The thin-film magnetic resistance effect type magnetic head of claim 2 wherein the spin-valve element further includes:

a soft magnetic material;

a non-magnetic conductive layer laminated on the soft magnetic material;

a fixed magnetic layer laminated on the non-magnetic conductive layer, with the antiferromagnetic layer being laminated on the fixed magnetic layer.

* * * * *